United States Patent
Izumi (10) Patent No.: US 8,228,541 B2
(45) Date of Patent: Jul. 24, 2012

(54) PRINTING APPARATUS AND PRINTING METHOD

(75) Inventor: Michihiro Izumi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 912 days.

(21) Appl. No.: 12/265,229

(22) Filed: Nov. 5, 2008

(65) Prior Publication Data

US 2009/0128846 A1 May 21, 2009

(30) Foreign Application Priority Data

Nov. 7, 2007 (JP) .................................. 2007-289961

(51) Int. Cl.
*G06F 3/12* (2006.01)
*H04N 1/46* (2006.01)
*G06K 15/00* (2006.01)
*G06K 9/36* (2006.01)

(52) U.S. Cl. ....... 358/1.15; 358/540; 358/1.17; 382/284

(58) Field of Classification Search .................. 358/1.15, 358/540, 538, 537, 1.2, 1.13, 1.16, 1.17; 382/175, 255, 282, 284; 715/744

See application file for complete search history.

(56) References Cited

U.S. PATENT DOCUMENTS

| | | | | |
|---|---|---|---|---|
| 6,853,461 | B1 * | 2/2005 | Shiimori ....................... | 358/1.15 |
| 7,180,618 | B2 * | 2/2007 | Ueda et al. ................... | 358/1.15 |
| 7,207,735 | B2 * | 4/2007 | Narusawa et al. ............ | 400/76 |
| 7,746,487 | B2 * | 6/2010 | Tsue et al. .................... | 358/1.13 |
| 2002/0015179 | A1 * | 2/2002 | Igarashi et al. ............... | 358/1.15 |
| 2002/0048413 | A1 * | 4/2002 | Kusunoki ...................... | 382/282 |
| 2002/0057454 | A1 * | 5/2002 | Ueda et al. .................... | 358/1.15 |
| 2002/0067500 | A1 * | 6/2002 | Yokomizo et al. ............ | 358/1.15 |
| 2002/0186402 | A1 * | 12/2002 | Jackson et al. ................ | 358/1.15 |
| 2003/0058457 | A1 * | 3/2003 | Fredlund et al. .............. | 358/1.2 |
| 2003/0160819 | A1 * | 8/2003 | Chase ........................... | 345/744 |
| 2004/0075866 | A1 * | 4/2004 | Thormodsen et al. ........ | 358/1.18 |
| 2005/0018926 | A1 * | 1/2005 | Momose et al. .............. | 382/284 |
| 2005/0134939 | A1 * | 6/2005 | Ikeda et al. ................... | 358/471 |
| 2005/0141941 | A1 * | 6/2005 | Narusawa et al. ............ | 400/76 |
| 2005/0219640 | A1 * | 10/2005 | Kasatani ....................... | 358/402 |
| 2005/0225799 | A1 * | 10/2005 | Berarducci et al. ........... | 358/1.15 |
| 2006/0007481 | A1 * | 1/2006 | Kato et al. .................... | 358/1.15 |
| 2006/0120618 | A1 * | 6/2006 | Mizoguchi .................... | 382/255 |
| 2006/0155732 | A1 * | 7/2006 | Momose et al. .............. | 707/101 |

(Continued)

FOREIGN PATENT DOCUMENTS

JP 2003-076534 A 3/2003

(Continued)

*Primary Examiner* — Madelein A Nguyen
(74) *Attorney, Agent, or Firm* — Canon U.S.A., Inc. IP Division (57) ABSTRACT

Embodiments of the invention generally relate to the printing of an image. In one version, first image data representing a first background image of a first size is stored in a memory. A printing apparatus is connected via a network to a server that stores second image data representing a second background image of a second size that is greater than the first size. A condition for printing is set based on image data representing an image to be printed. Based on the set condition, the image data representing the image to be printed is synthesized with the first image data representing the background image that is stored in the memory or the second image data obtained from the server by accessing the server via the network. Printing is performed based on the synthesized image data.

6 Claims, 8 Drawing Sheets

U.S. PATENT DOCUMENTS

| | | | |
|---|---|---|---|
| 2006/0170968 A1* | 8/2006 | Maki et al. | 358/1.15 |
| 2006/0203285 A1* | 9/2006 | Yamaguchi et al. | 358/1.15 |
| 2007/0024909 A1* | 2/2007 | Hanechak | 358/1.18 |
| 2007/0035755 A1* | 2/2007 | Maki et al. | 358/1.9 |
| 2007/0103723 A1* | 5/2007 | Wolcott et al. | 358/1.15 |
| 2007/0171464 A1* | 7/2007 | Nakajima | 358/1.15 |
| 2007/0182999 A1* | 8/2007 | Anthony et al. | 358/452 |
| 2008/0117448 A1* | 5/2008 | Ijams et al. | 358/1.15 |
| 2008/0240565 A1* | 10/2008 | Kitazaki | 382/175 |
| 2011/0013226 A1* | 1/2011 | Grosz et al. | 358/1.15 |

FOREIGN PATENT DOCUMENTS

JP     2005-039785 A     2/2005

* cited by examiner

Prior Art

PRINTING APPARATUS AND PRINTING METHOD

BACKGROUND OF THE INVENTION

1. Field of the Invention

The present invention relates to a printing apparatus that can connect to a network, obtain print contents via the network, and print using the contents.

2. Description of the Related Art

Recent printing apparatuses such as inkjet printers and multifunction inkjet printers are capable of printing not only documents, but also photographs taken by a digital camera and the like. By connecting a memory card, the printing apparatus can also print photographs and the like by the operation of the printing apparatus main body alone, without using a personal computer (PC).

Japanese Patent Laid-Open No. 2005-39785 discloses printing apparatus having the capability of synthesizing a photograph and a design such as a frame when printing a photograph. Generally, when performing synthesize-printing, a frame image is downloaded from a home page or the like. The frame image and a photographic image are synthesized using image editing software on a PC, and the synthesized image is printed. Japanese Patent Laid-Open No. 2003-76534 discloses a method of obtaining print contents via a network.

Figure 8:
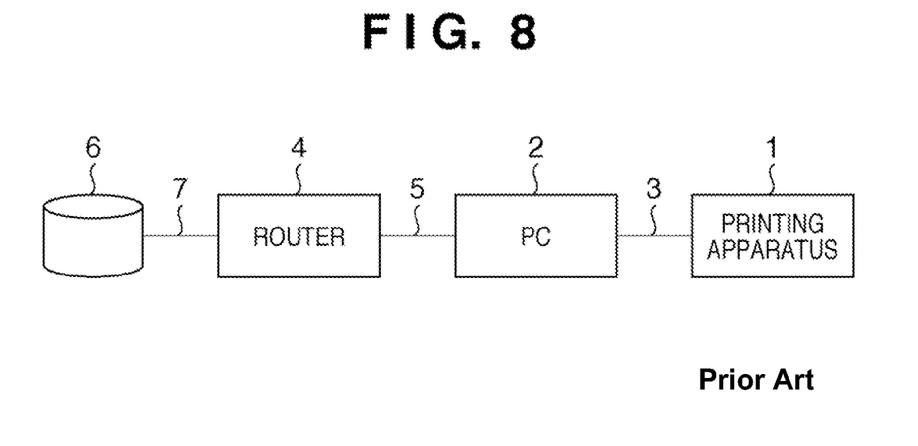
FIG. 8 is a block diagram showing a system configuration using a conventional printing apparatus.

FIG. 8 is a block diagram showing the configuration of a conventional system that prints using contents obtained via a network. In FIG. 8, reference numeral 1 denotes a printing apparatus; and 2, a PC (Personal Computer). The printing apparatus 1 and PC 2 are connected via, e.g., a USB interface 3. The printing apparatus 1 can print, via the USB interface 3, an image synthesized by the PC 2.

A router 4 is connected to, e.g., a high-speed optical communication line, and connected to the PC 2 via, e.g., a LAN cable 5. For example, when connecting the PC 2 to an external network, the router 4 converts ETHERNET® data transmitted via the LAN cable into optical communication line data.

A server 6 is an Internet server, and stores print contents such as a frame image file. The server 6 and router 4 are connected via, e.g., an optical communication line 7, and can exchange data at a transmission rate of 100 Mbps.

The printing apparatus incorporates several small-capacity frame images, and can synthesize and print a frame image and photographic image in accordance with the operation of the printing apparatus main body.

When synthesizing and printing a frame image in the system having this configuration, the user browses print contents on a network via browser software in the PC 2, and downloads a frame image he/she wants to use. The user connects a memory card to the PC 2, and loads images from the memory card into the PC 2. Then, the user activates image processing software, and synthesizes and prints the downloaded frame image and a photographic image loaded from the memory card. The print data generated by the printer driver is transmitted to the printing apparatus 1, and the printing apparatus 1 prints.

However, the following issues may arise when synthesizing and printing a desired image and an image such as a frame in the above-described manner.

When synthesizing an image such as a frame using a PC and printing the synthesized image, the user usually must be fairly skilled at operating image editing software on the PC. Also, since the PC generally needs to be connected, a user who does not have a PC typically cannot synthesize and print a frame image. When downloading print contents from a network, the PC generally must be connected to the network. Even if the PC is connected to the network, it may take a long time to download print contents from the network, which may result in a poor working efficiency, for example upon printing on a printing medium of the frequently used L size.

Furthermore, when synthesizing and printing an image such as a frame using only a printing apparatus, in certain cases it may not be desirable to store many frame images and the like in the printing apparatus because of the following reason. High-quality printing typically requires high-resolution image data, and the amount of high-resolution image data may be relatively large. To store a high-resolution frame image and the like, the printing apparatus may thus need to incorporate a relatively large-capacity memory, which may raise the apparatus cost. Thus, in certain cases, the type of frame image and the like storable in the printing apparatus may be limited. In particular, the file size of an image printable in a large size such as the A4 size can reach several MB (Mega Bytes). Accordingly, it may be difficult to store many large-size frame images and the like at low cost.

SUMMARY OF THE INVENTION

In one aspect, a printing apparatus and printing method according to this invention are capable of relatively easily printing an image with various kinds of contents at a relatively high working efficiency.

According to one aspect of the present invention, there is provided a printing apparatus capable of synthesizing and printing image data representing an image to be printed and image data representing a background image. The apparatus includes a memory that stores first image data representing a first background image of a first size; a connection unit configured to connect the printing apparatus via a network to a server that stores second image data representing a second background image of a second size that is larger than the first size; and an obtaining unit configured to obtain the second image data representing the second background image that is stored in the server, by accessing the server via the network. The apparatus also includes a setting unit configured to set a condition for printing using the image data representing the image to be printed; a synthesizing unit configured to synthesize, based on the condition set by the setting unit, the image data representing the image to be printed, and the first image data representing the first background image that is stored in the memory or the second image data representing the second background image that is stored in the server; and a printing unit configured to print based on the image data representing the image to be printed that has been synthesized by the synthesizing unit with the first or second image data.

Further features of the present invention will become apparent from the following description of exemplary embodiments with reference to the attached drawings.

DESCRIPTION OF THE EMBODIMENTS

Embodiments of the present invention will now be described in detail in accordance with the accompanying drawings.

In this specification, the terms "print" and "printing" include not only the formation of significant information such as characters and graphics, but also broadly include the formation of images, figures, patterns, and the like on a print medium, or the processing of the medium, regardless of whether they are significant or insignificant, and whether they are so visualized as to be visually perceivable by humans.

Also, the term "print medium" includes not only a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, and can process a print medium that can process the ink. The processing of ink includes, for example, solidifying or insolubilizing a coloring agent contained in ink that is applied to the print medium.

Figure 1:
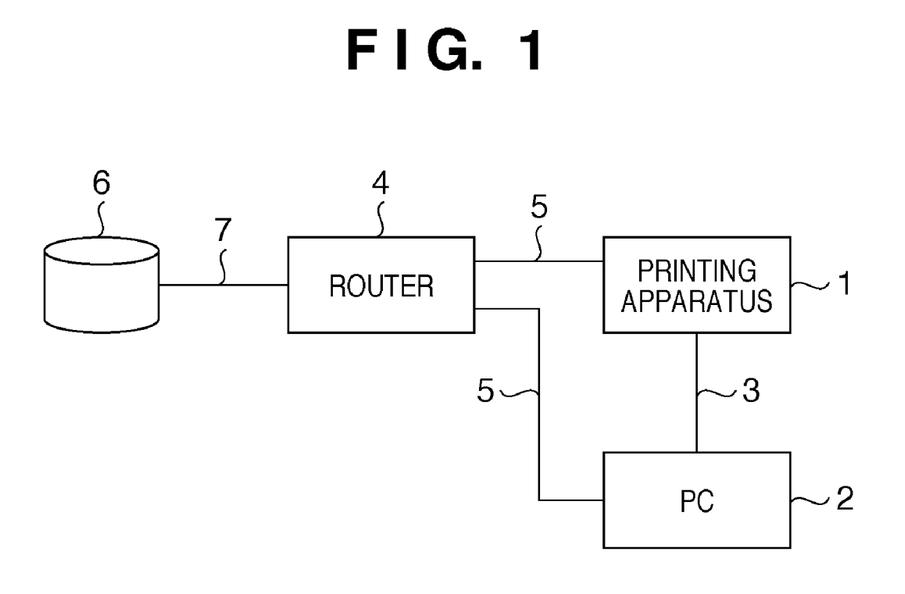
FIG. 1 is a block diagram showing a system configuration using a printing apparatus according to an embodiment of the present invention.

FIG. 1 is a block diagram showing a system configuration using a printing apparatus according to a first embodiment of the present invention. In FIG. 1, reference numeral 1 denotes a printing apparatus according to the first embodiment of the present invention; and 2, a PC (Personal Computer). The printing apparatus 1 and PC 2 are connected via a USB interface 3. The printing apparatus 1 can print, via the USB interface 3, an image synthesized by the PC 2. Note that, at least in the embodiment as shown, the PC 2 is not an indispensable component in implementing the present invention.

A router 4 may be connected to a high-speed optical communication line, and may be connected to the PC 2 via a LAN cable 5. When connecting the printing apparatus 1 and PC 2 to an external network, the router 4 may convert ETHERNET® data transmitted via the LAN cable into optical communication line data.

A server 6 may be an Internet server, and may store print contents such as a frame image (e.g., background image) file. The server 6 and router 4 may be connected via an optical communication line 7, and may be capable of exchanging data at a transmission rate of 100 Mbps.

Figure 2:
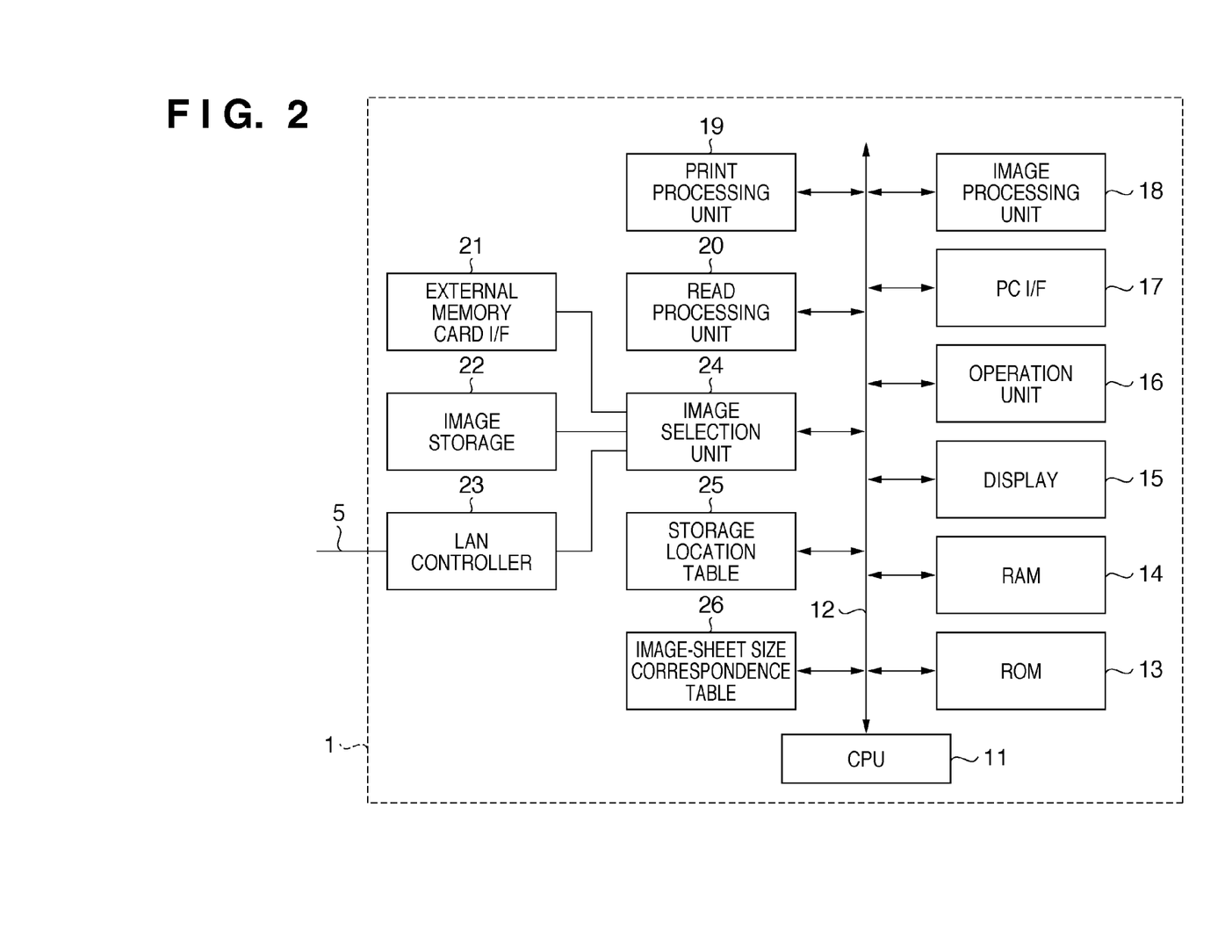
FIG. 2 is a block diagram showing the arrangement of a printing apparatus according to an embodiment of the present invention.

FIG. 2 is a block diagram showing the arrangement of the printing apparatus according to the first embodiment of the present invention.

In FIG. 2, reference numeral 11 denotes a CPU which controls each element of the printing apparatus 1; 12, a data/address bus; 13, a ROM; and 14, a RAM. The CPU 11 accesses the ROM 13 and RAM 14 via the data/address bus 12, and executes a program stored in the ROM 13, thereby operating the printing apparatus.

A display 15 may be formed from a QVGA 2.5" liquid crystal display in this embodiment, and displays a message to the user. An operation unit 16 has various keys used when the user operates the apparatus. A PC interface (I/F) 17 may be connectable to the PC via a USB cable.

An image processing unit 18 performs various image conversion processes. More specifically, the image processing unit 18 executes a synthesizing process for a plurality of image files, a density conversion process for a read image, a color correction process, and the like. A print processing unit 19 converts data generated by the image processing unit 18 into data of a format printable by an inkjet printhead. A read processing unit 20 may be formed from a CIS (Contact Image Sensor) for reading a document.

An external memory card I/F 21 allows for connecting various memory cards such as a CF card and SD card, and reading out data stored in these memory cards. An image data storage 22 is formed from a nonvolatile memory for storing frame image data (e.g., background data), such as a frame image data file, of a relatively small size. A LAN controller 23 can perform a data conversion process to exchange data with a network according to an ETHERNET® protocol.

An image selection unit 24 functions to select image data subjected to an image process before printing. The image selection unit 24 can be implemented, for example, by firmware. A table 25 stores the storage location of a frame image, and stores the storage location of each frame image available in the printing apparatus. For data stored on a network, the table 25 stores the URL (Uniform Resource Locator) of a server that saves frame image data (e.g., background data), such as a frame image data file, of a relatively large size. For example, the image data stored in memory by the image data storage 22 may be first image data having a first size for a first background image, and the image data stored on the server may be second image data having a second size that is greater than the first size, for a second background image. A table 26 stores the size of a printing medium available for printing for each frame image stored in the image data storage 22. Part of the ROM 13 is also available for storing such information.

Figure 3A:
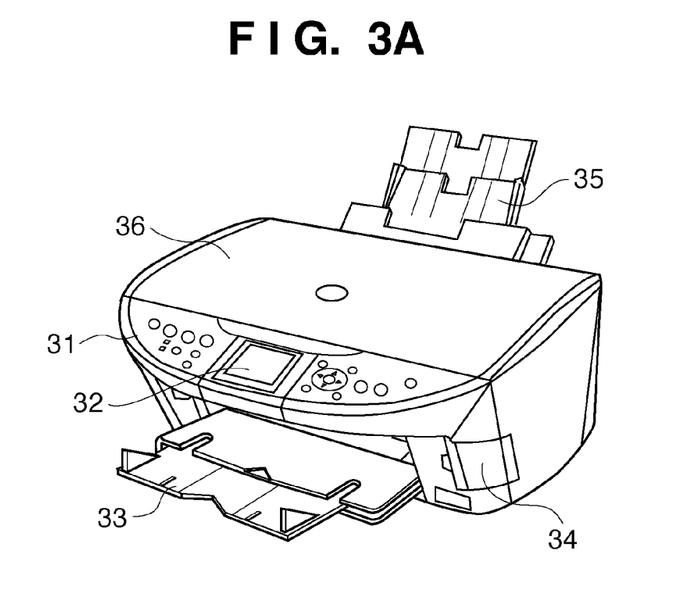
FIGS. 3A and 3B are views, respectively, showing the outer appearance and operation unit of the printing apparatus according to an embodiment of the present invention.

FIG. 3A is a perspective view showing the outer appearance of an embodiment of the printing apparatus main body. In FIG. 3A, reference numeral 31 denotes an operation unit; 32, a display; 33, a delivery tray; 34, a memory card connection portion; 35, a document feed portion; and 36, a document table.

Figure 3B:
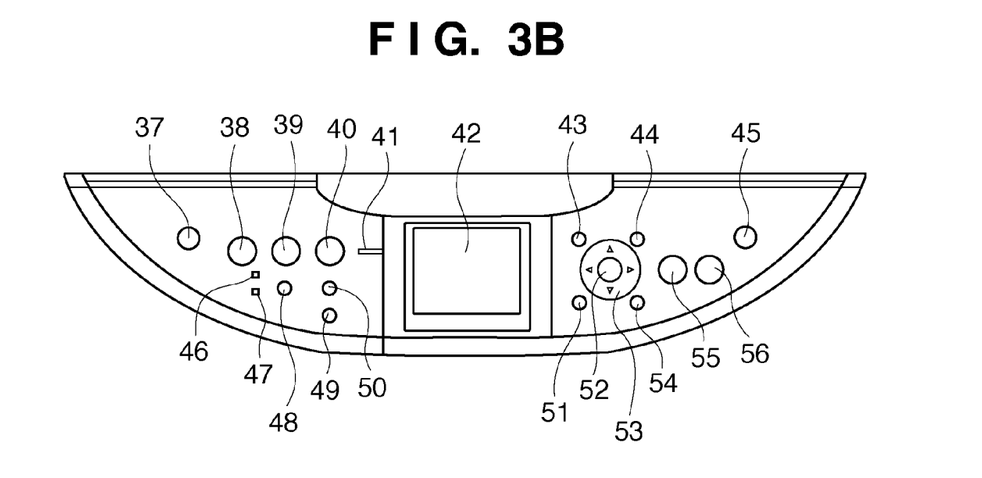

FIG. 3B is a view showing an embodiment of the operation unit 31 in detail. In FIG. 3B, reference numeral 37 denotes a power key; 38, a copy key for setting a copy mode; 39, a scanner key for setting a scanner mode; and 40, a memory card key for setting a mode in which a memory card is used. Reference numeral 41 denotes an error display lamp; 42, a liquid crystal display; 43, a menu key used to display a menu; 44, a setting key for setting the size of a printing medium and the like; and 45, a stop key. An auto sheet feeder lamp 46 and cassette lamp 47 display the setting states of the respective sheet feed sources. A sheet feed switching key 48 is used to switch the sheet feed source between an auto sheet feeder and a cassette. A date designation key 49 is used to select a photographic image in a memory card. A navigation sheet mode key 50 is used to print a navigation sheet. A key 51 is used to return to a preceding window. A confirmation key 52 is used to confirm an operation. A four-way selector key 53 is used to scroll a displayed menu. A trimming key 54 is used to trim a photographic image. Reference numeral 55 denotes a monochrome copy start key; and 56, a color copy start key.

Figure 4A:
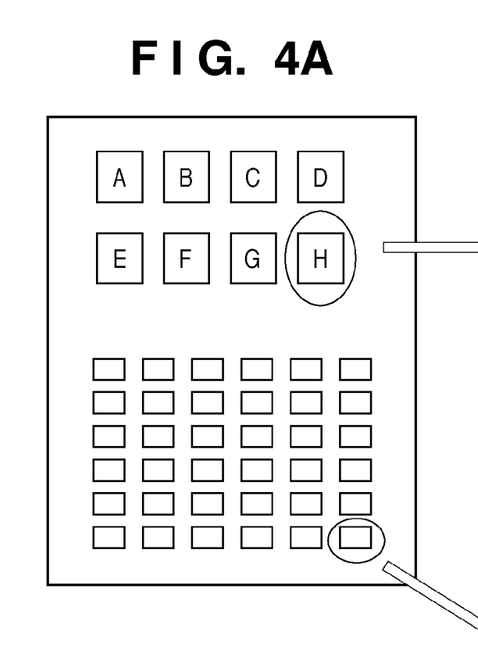
FIGS. 4A, 4B, and 4C are views showing an embodiment of a navigation sheet for selecting a frame image and photographic image to be printed.

FIG. 4A is a schematic view showing an embodiment of a navigation sheet for selecting a frame image to be printed and an inputtable photographic image.

In FIG. 4A, rectangles with symbols "A" to "H" on the upper side represent frame images, and the rectangles below them represent the thumbnail images of photographic images input from a memory card.

Figure 4B:
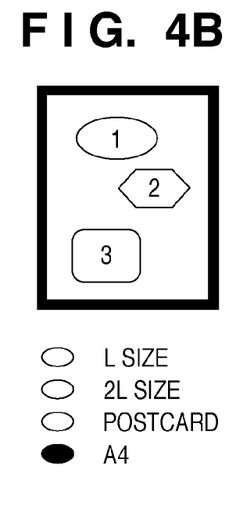

FIG. 4B shows an embodiment of details of a frame image and its selected portion. Fill-in portions (marking portions) are provided below the frame image to be selected, with the fill-in portions representing, as a condition for printing, the size of a printing medium used to print. The user selects the size of a printing medium used to print by filling in a corresponding marking portion. FIG. 4B indicates that A4 has been selected. The user designates the layout position of a selected photographic image in correspondence with one of numerals in the frames of a frame image.

Figure 4C:
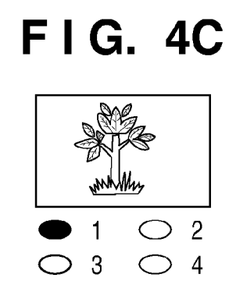

FIG. 4C shows details of an embodiment of a thumbnail image of a photographic image and a portion selected for the photographic image. Marking portions are provided below the photographic image to designate which frame of a frame image in which the photographic image is to be laid out. The user selects a frame similarly to the method of selecting the size of a printing medium. FIG. 4C indicates that the user has designated frame "1" in FIG. 4B.

Figure 5:
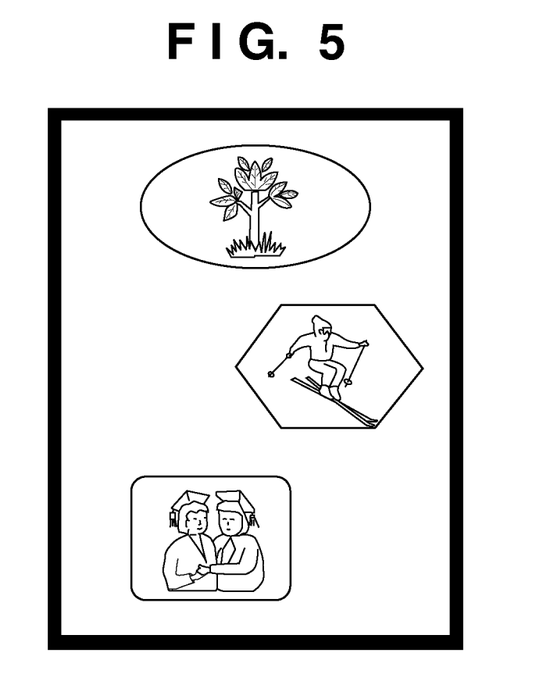
FIG. 5 is a view showing an example of the result of synthesizing and printing a frame image and photographic image.

FIG. 5 shows an example of the result of synthesizing and printing a frame image and photographic image selected in the above-described manner.

Figure 6:
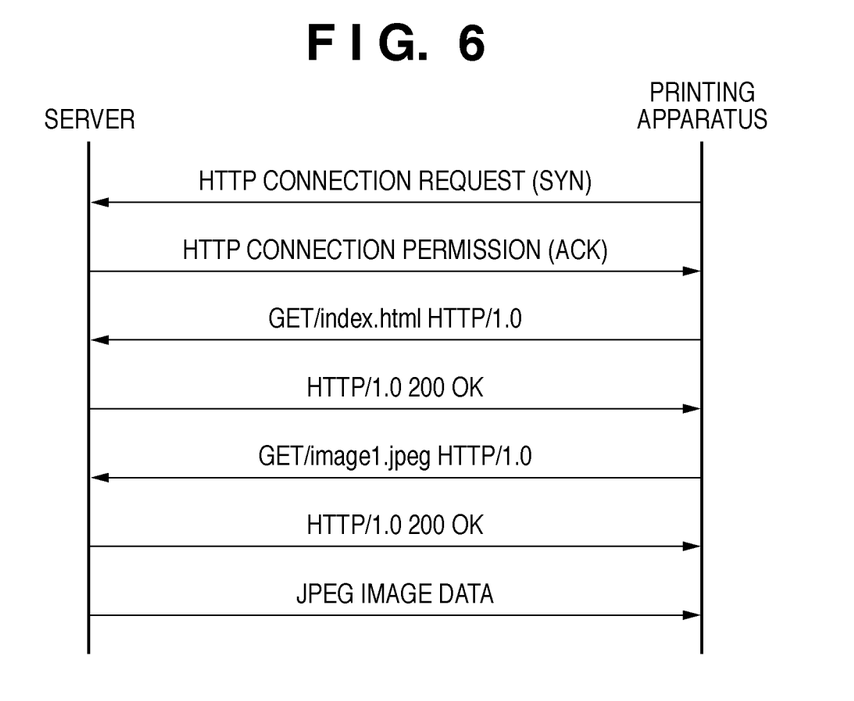
FIG. 6 is an example of a communication sequence when downloading a frame image from a network.

FIG. 6 is an example of a communication sequence when downloading a frame image from a network. HTTP is exemplified as the communication protocol.

In one version, the printing apparatus issues a connection request to the server according to HTTP (Hyper Text Transfer Protocol), and the server permits the connection. The printing apparatus issues a request to obtain an index, and the server permits the request. Then, the printing apparatus issues a request to obtain desired JPEG image data (image1.jpeg), and the server permits the request. As a result, the JPEG image data is downloaded.

Figure 7A:
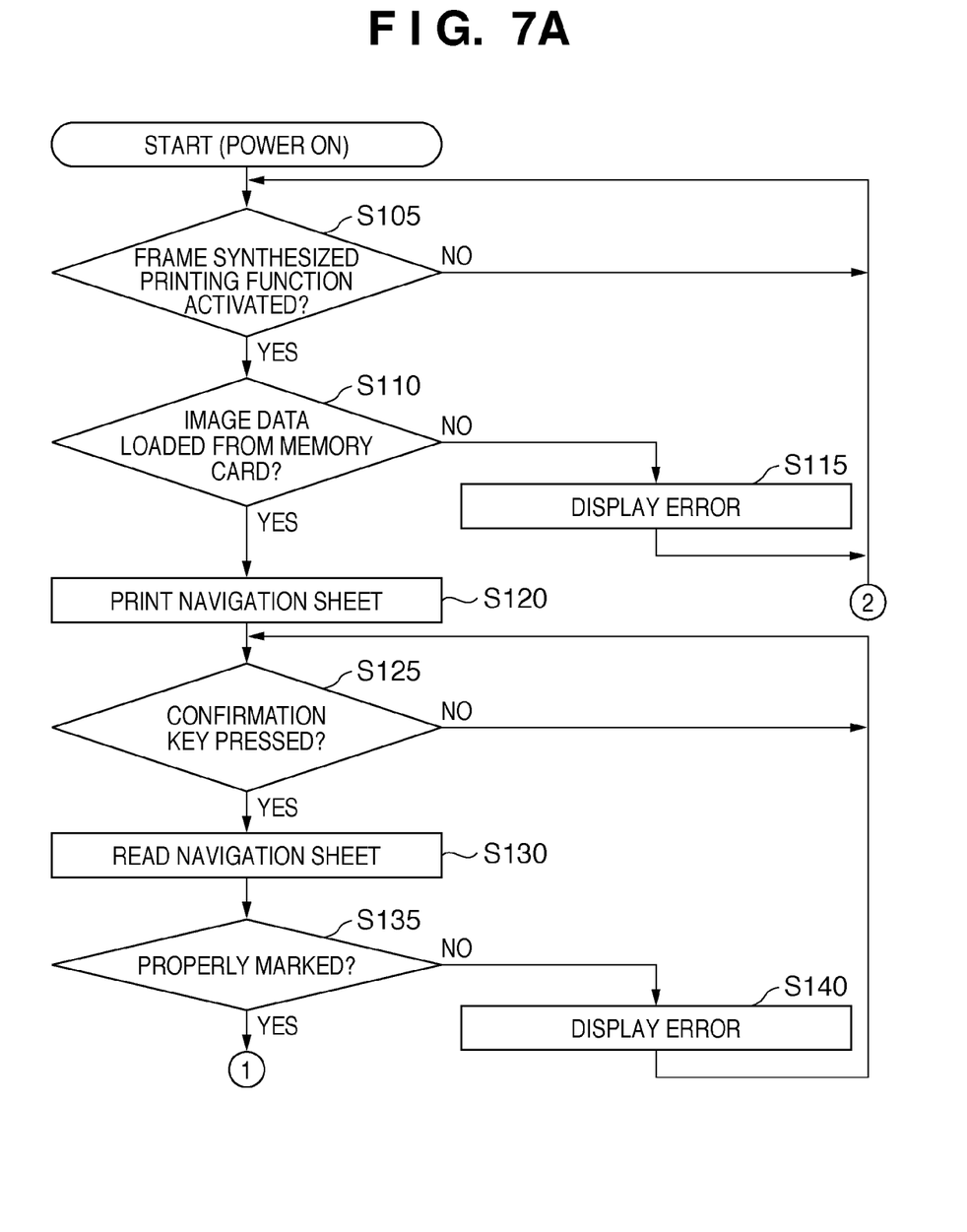
FIGS. 7A and 7B are examples of flowcharts for synthesizing and printing a frame image and photographic image.
Figure 7B:
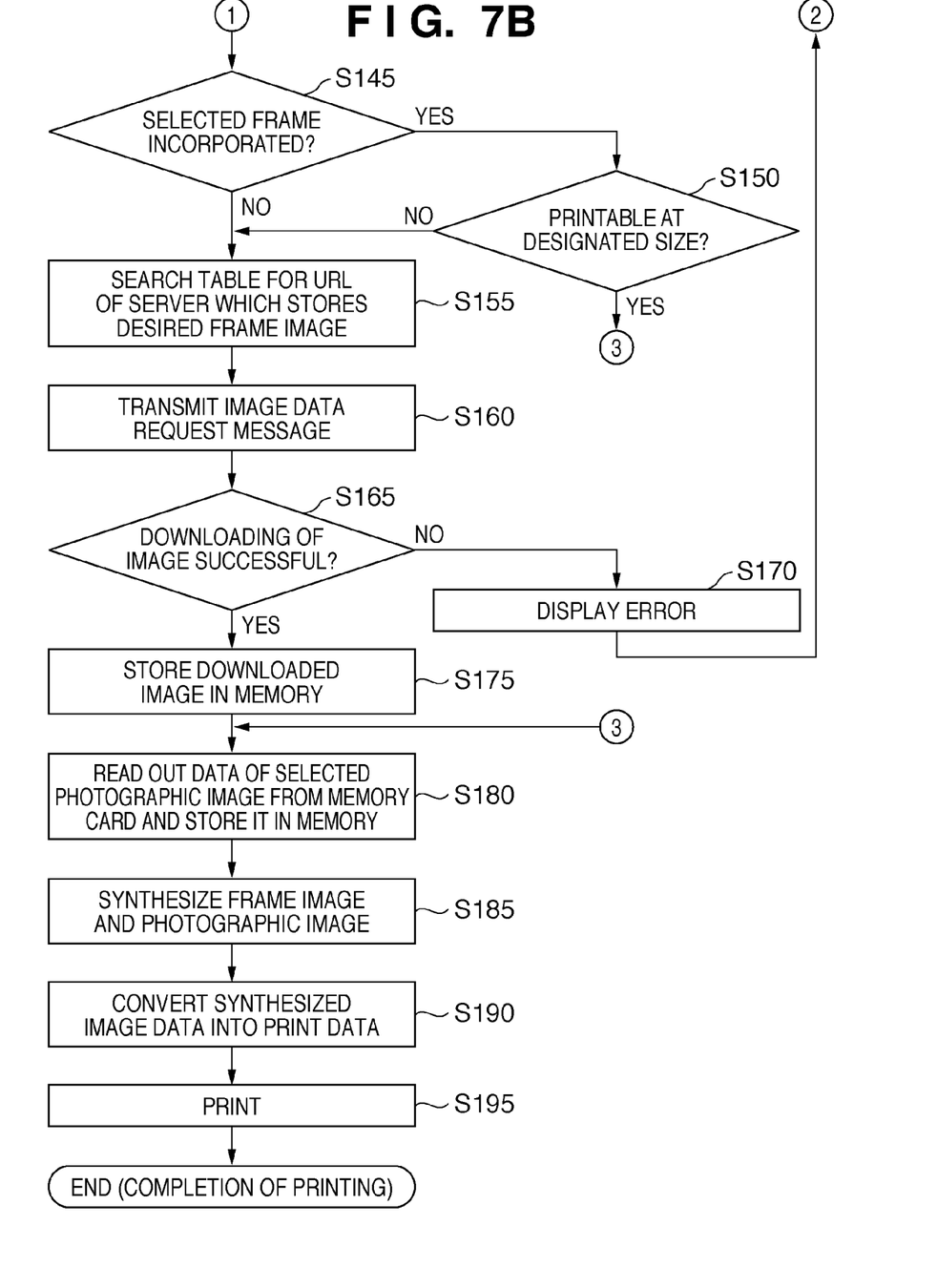

FIGS. 7A and 7B are embodiments of flowcharts for synthesizing and printing a frame image and photographic image.

An embodiment of a frame synthesized printing operation for synthesizing and printing a frame image and photographic image will be explained with reference to the flowcharts of FIGS. 7A and 7B.

When the user presses the menu key 43, the printing apparatus displays "copy", "photo print", "frame synthesized print", and "scanner" as available functions on the liquid crystal display 42. If the user selects "frame synthesized print" with the four-way selector key 53 and presses the confirmation key 52, the frame synthesized printing function is activated (YES in step S105).

After activating frame synthesized printing, processing advances to step S110, where the printing apparatus accesses the memory card interface 21 to check whether there is a memory card and whether there is image data in the memory card (step S110). If the printing apparatus has failed to load image data from a memory card (NO in step S110), for example, if there is no memory card or there is no image data in the memory card, processing advances to step S115 where it displays an error "There is no image in the memory card." on the liquid crystal display 42 (step S115), ending frame synthesized printing.

If the printing apparatus has successfully loaded image data from a memory card (YES in step S110), it loads image data of frame images stored in the printing apparatus. The RAM 14 stores the image data of the frame images and those of photographic images loaded from the memory card. The image processing unit 18 and print processing unit 19 convert the image data of the frame images and photographic images stored in the RAM 14 into the print image of a navigation sheet, as shown for example in FIGS. 4A to 4C. Then, the printing apparatus prints the navigation sheet (step S120).

After printing the navigation sheet, the printing apparatus displays "Mark images for use, set the navigation sheet on the scanner, and press the confirmation key" on the liquid crystal display 42. When the user marks a frame image and photographic image for use, sets the navigation sheet on the scanner, and presses the confirmation key (YES in step S125), the printing apparatus reads the navigation sheet by the read processing unit 20 (step S130). The read processing unit 20 detects marking portions in the read image, and checks whether portions are correctly marked (step S135). If portions are not marked, or the number of frames of a frame image and that of marked photographic images do not coincide with each other (NO in step S135), the printing apparatus displays an error message "Marking portions are not proper. Mark necessary portions again." on the liquid crystal display 42 (step S140), and returns to step S125. If the printing apparatus confirms that portions are properly marked (YES in step S135), it checks, based on the image storage location table 25, whether the image storage 22 stores the selected frame image (step S145).

If the printing apparatus determines in step S145 that the image storage 22 does not store the selected frame image (NO in step S145), the frame image may need to be downloaded from a network, and processing advances to step S155. If the printing apparatus determines that the image storage 22 does store the selected frame image (YES in step S145), then processing advances to step S150. Also, if the printing apparatus determines in step S150 that the image stored in the image data storage 22 cannot be printed on a printing medium of a size for printing (NO in step S150), the frame image needs to be downloaded from a network, and processing advances to step S155. Conversely, if the printing apparatus determines in step S150 that the image stored in the image data storage 22 can be printed on the printing medium having the designated size (YES in step S150), processing advances to step S180 described in more detail below.

In the first embodiment, it is assumed that it has been selected to print frame image H shown in FIG. 4A on an A4 sheet. Also, it is assumed that the printing apparatus holds the frame image H, and the held image corresponds to 2,000,000 pixels and has a file size of about 500 KB. This image may not be satisfactorily printed on an A4 sheet. In this case, the image storage location table is searched to obtain the URL of a server that stores frame images (step S155).

After the frame image storage location is identified, the image data is downloaded from a predetermined URL according to the HTTP communication sequence shown in FIG. 6. For example, the printing apparatus transmits a connection request message, and when it receives a connection permission message from the server, it transmits an image data request message "GET/image1.jpeg HTTP/1.0" (step S160). Then the printing apparatus downloads a desired frame image (step S165). For example, the image downloaded from the network corresponds to 8,000,000 pixels and has a file size of about 5 MB. Assuming that the communication rate of the optical communication line is about 100 Mbps, a 5-MB file can be downloaded in about 0.4 sec.

If the communication sequence has not ended successfully and the printing apparatus has failed to download a frame image (NO in step S165), the printing apparatus displays an error "Communication error has occurred." on the liquid crystal display 42 (step S170), and the process returns to step S105. If the printing apparatus has successfully downloaded a frame image (YES in step S165), it stores the downloaded frame image in the RAM 14 (step S175).

Subsequently, the printing apparatus reads out, from the memory card, image data of a photographic image selected from the navigation sheet, and stores it in the RAM 14 (step S180). The image processing unit 18 synthesizes the image data of the frame image and photographic image stored in the RAM 14 (step S185). The print processing unit 19 converts the synthesized image data into print data (step S190).

The printing apparatus transfers the print data to the printhead to execute printing (step S195), completing printing of the frame-synthesized image as shown in FIG. 5.

If it is determined in step S150 that the printing medium used to print is a printing medium of a predetermined L size or smaller, even though a 2-megapixel frame image stored in the printing apparatus is used, the image can still provide satisfactory image quality. In this case, the process advances to step S180 without accessing the network. The printing apparatus reads out, from the memory card, image data of a photographic image selected from the navigation sheet, and stores it in the RAM 14. The printing apparatus synthesizes the frame image stored in the printing apparatus and the photographic image in the memory card (step S185). The printing apparatus converts the synthesized image data into print data (step S190), and executes frame synthesized printing (step S195).

As described above, when printing on a printing medium of the frequently used L-size, a frame image stored in the printing apparatus may be used. When printing on a printing medium of a less frequently used size (e.g., the A4 size) that is larger than the L-size, a frame image downloaded from a server on a network maybe used. This makes it possible to perform frame synthesized printing the user desires, without necessarily requiring use of a PC.

Frame images saved on a network can also be easily changed or added. When a frame image on a network is updated, it may be desirable to make it possible for the user to select the updated frame image in the printing apparatus. Thus, when a frame image on a network is updated, the updated information may be downloaded from the server to update the storage location table 25 which stores a URL in the server. Further, when image data of a frame image newly added to the server is downloaded to print a navigation sheet, the navigation sheet may be printed using the newly added frame image. This update process may allow the user to virtually always use the latest frame images. Note that while HTTP has been exemplified as the communication protocol, the present invention may also employ another communication protocol such as FTP (File Transfer Protocol).

The first embodiment has described an apparatus and method for printing a navigation sheet, and selecting, by the user from the navigation sheet, a photographic image and frame image to be synthesized.

However, the means for selecting a photographic image and frame image is not limited thereto. The same effects as those of the first embodiment can also be attained, for example, by sequentially displaying frame images and photographic images on a color liquid crystal display and designating images for use with the key of an operation unit.

The first embodiment has also described an apparatus and method for determining, in accordance with the size of a printing medium used to print, which of a frame image stored in a printing apparatus or a frame image downloaded from a network is to be used.

However, which of a frame image stored in a printing apparatus or a frame image downloaded from a network is to be used can also be determined based on a determination criterion other than the size of a printing medium used to print.

For example, when A4 is selected as the size of a printing medium used to print, but the type of printing medium is not glossy paper but normal paper, it may be considered that such printing to be performed is only provisional printing that does not require high print quality. In this case, the printing may be completed within a short time of period by not using a frame image downloaded from a network but instead using a frame image stored in a printing apparatus.

Thus, according to one aspect of the invention, even when performing frame synthesized printing on a printing medium of a large size such as A4, no large-capacity frame image may need to be stored in the memory of a printing apparatus, and the cost of the printing apparatus may thus be reduced. In another aspect in accordance with the invention, when performing frame synthesized printing on a printing medium of a small size such as the frequently used L size, a small-capacity frame image can be stored in the printing apparatus, and frame synthesized printing can be quickly executed without necessarily requiring a downloading process. Furthermore, in some embodiments in accordance with the invention, even if the printing apparatus is not connected to a high-speed communication line, or it is difficult to connect the printing apparatus to a network, frame synthesized printing at the L and smaller sizes may still be possible. Furthermore, is some embodiments in accordance with the invention, the user may be capable of executing frame synthesized printing by a simple operation, without necessarily requiring the user to be conscious of the image size or requiring use of a PC.

While the present invention has been described with reference to exemplary embodiments, it is to be understood that the invention is not limited to the exemplary embodiments disclosed herein. The scope of the following claims is to be accorded the broadest interpretation so as to encompass all such modifications and equivalent structures and functions.

This application claims the benefit of Japanese Patent Application No. 2007-289961, filed Nov. 7, 2007, which is hereby incorporated by reference herein in its entirety.

What is claimed is:

1. A printing apparatus capable of synthesizing and printing image data representing an image to be printed and image data representing a background image, the apparatus comprising:
   a memory that stores first image data representing a first background image of a first size;
   a connection unit configured to connect the printing apparatus via a network to a server that stores second image data representing a second background image of a second size that is greater than the first size;
   an obtaining unit configured to obtain the second image data representing the second background image that is stored in the server, by accessing the server via the network;
   a setting unit configured to set a condition for printing using the image data representing the image to be printed, the condition including a size of a printing medium used for printing the image represented by the image data;
   a synthesizing unit configured to
      in a case where the size of the printing medium included in the condition set by the setting unit is not larger than a predetermined size, synthesize the image data representing the image to be printed and the first image data read from the memory without going through the network, and in a case where the size of the printing medium included in the condition set by the setting unit is larger than the predetermined size, synthesize the image data representing the image to be printed and the second image data obtained by the obtaining unit from the server via the network; and a printing unit configured to print the image data representing the image to be printed that has been synthesized with the first or second image data.

2. The apparatus according to claim 1, further comprising a table which stores a URL of the server.

3. The apparatus according to claim 1, further comprising:
a control unit configured to control the printing unit to print a sheet used for filling in a selection of one or more images from a plurality of inputtable images;
an image reading unit configured to read the sheet; and
an input unit configured to input image data corresponding to images selected based on the selection in the sheet filled in by a user and read by the image reading unit.

4. The apparatus according to claim 3, wherein the control unit controls printing, on the sheet, thumbnail images of the plurality of inputtable images, and fill-in portions for filling in whether or not to select each of the thumbnail images.

5. A printing method for a printing apparatus capable of synthesizing and printing image data representing an image to be printed and image data representing a background image, the method comprising:
storing, in a memory, first image data representing a first background image of a first size;
connecting the printing apparatus via a network to a server that stores second image data representing a second background image of a second size that is larger than the first size;
setting a condition for printing based on the image data representing the image to be printed, the condition including a size of a printing medium used for printing the image represented by the image data;
synthesizing
in a case where the size of the printing medium included in the set condition is not larger than a predetermined size, the image data representing the image to be printed and the first image data read from the memory without going through the network, and
in a case where the size of the printing medium included in the set condition is larger than the predetermined size, the image data representing the image to be printed and the second image data obtained from the server via the network; and
printing the image data representing the image to be printed that has been synthesized with the image data representing the first or second background image.

6. A non-transitory computer-readable storage medium which stores a computer-executable program for performing a printing method for a printing apparatus capable of synthesizing and printing image data representing an image to be printed and image data representing a background image, the method comprising:
storing, in a memory, first image data representing a first background image of a first size;
connecting the printing apparatus via a network to a server that stores second image data representing a second background image of a second size that is larger than the first size;
setting a condition for printing based on the image data representing the image to be printed, the condition including a size of a printing medium used for printing the image represented by the image data;
synthesizing
in a case where the size of the printing medium included in the set condition is not larger than a predetermined size, the image data representing the image to be printed and the first image data read from the memory without going through the network, and
in a case where the size of the printing medium included in the set condition is larger than the predetermined size, the image data representing the image to be printed and the second image data obtained from the server via the network; and
printing the image data representing the image to be printed that has been synthesized with the image data representing the first or second background image.

* * * * *